United States Patent
Prigent et al.

(10) Patent No.: US 6,911,258 B1
(45) Date of Patent: Jun. 28, 2005

(54) OPTICAL FIBER CABLE HAVING IMPROVED PROPERTIES

(75) Inventors: Madeleine Prigent, Marcoussis (FR); Sophie Vanpoulle, Gif sur Yvette (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/559,595

(22) Filed: Apr. 28, 2000

(30) Foreign Application Priority Data

May 6, 1999 (FR) .............................. 99 05764

(51) Int. Cl.⁷ .............................. D02G 3/00; H01B 3/00
(52) U.S. Cl. ...................... 428/372; 428/379; 428/383; 428/392; 174/110 R; 174/113 R; 385/127; 385/128; 385/126
(58) Field of Search ................. 385/126, 127, 385/128, 123, 145; 428/372, 375, 379, 383, 392, 391; 174/113 R, 121 A, 118, 110 A

(56) References Cited

U.S. PATENT DOCUMENTS

| | | | |
|---|---|---|---|
| 4,018,962 A | * | 4/1977 | Pedlow .......................... 260/24 |
| 4,018,983 A | * | 4/1977 | Pedlow .......................... 174/71 |
| 4,609,590 A | * | 9/1986 | Suzuki et al. ................ 428/378 |
| 4,739,007 A | * | 4/1988 | Okada et al. ................. 524/789 |
| 4,810,734 A | * | 3/1989 | Kawasumi et al. .......... 523/216 |
| 5,173,960 A | * | 12/1992 | Dickinson ................... 385/100 |
| 5,182,786 A | * | 1/1993 | Kinaga et al. ............... 385/128 |
| 5,324,588 A | * | 6/1994 | Rinehart et al. .......... 428/475.8 |
| 5,385,776 A | * | 1/1995 | Maxfield et al. .......... 428/297.4 |
| 5,656,371 A | * | 8/1997 | Kawahigashi et al. ...... 428/375 |
| 5,672,640 A | * | 9/1997 | Brauer ........................ 523/173 |
| 5,760,121 A | * | 6/1998 | Beall et al. .................. 524/150 |
| 6,110,593 A | * | 8/2000 | Szum et al. ................. 428/383 |
| 6,190,775 B1 | * | 2/2001 | Smith et al. ................. 428/417 |
| 6,238,790 B1 | * | 5/2001 | Smith et al. ................. 428/379 |
| 6,415,090 B1 | * | 7/2002 | Taylor et al. ................ 385/128 |
| 6,430,344 B1 | * | 8/2002 | Dixon et al. ................. 385/109 |
| 2002/0010248 A1 | * | 1/2002 | Fomperie et al. ........... 524/445 |
| 2002/0054995 A1 | * | 5/2002 | Mazurkiewicz ............. 428/364 |
| 2004/0028369 A1 | * | 2/2004 | Aylward et al. ............. 385/145 |

FOREIGN PATENT DOCUMENTS

| | | |
|---|---|---|
| EP | 0 145 213 A2 | 6/1985 |
| EP | 0 516 438 A1 | 12/1992 |
| EP | 0 751 535 A2 | 1/1997 |
| EP | 1052534 A1 * | 11/2000 |
| JP | 63 216 011 A | 9/1988 |

* cited by examiner

*Primary Examiner*—Rena Dye
*Assistant Examiner*—J. M. Gray
(74) *Attorney, Agent, or Firm*—Sughrue Mion, PLLC

(57) ABSTRACT

A cable containing at least one optical fiber and at least one covering layer containing a material including an organic compound and an inorganic compound, wherein the inorganic compound has a layered structure and the organic compound is inserted between the layers of the inorganic compound.

14 Claims, 1 Drawing Sheet

OPTICAL FIBER CABLE HAVING IMPROVED PROPERTIES

The present invention relates to an optical fiber cable whose properties, in particular its mechanical, water repellent, and fire resistant properties, are significantly improved compared with presently known cables. Such cables are used for data transmission.

The invention relates more particularly to the material included in one of the covering layers placed around a fiber or a set of fibers.

In general, such cables comprise one or more optical fibers. Each fiber is constituted by an optical core surrounded by optical cladding. The fiber is surrounded by at least one layer of a protective covering. The fibers can be brought together in a ribbon or a bundle and the set of fibers is then in turn surrounded by one or more layers of a protective covering.

The role of the covering is to protect the optical fiber(s) from external mechanical damage, moisture penetration, and if necessary to provide electrical insulation. In addition, in the event of a fire, it must provide sufficient resistance to fire. At present, most such coverings comprise a continuous matrix, generally made of a polymer, optionally containing filler particles that may be inorganic.

An object of the present invention is to propose an optical fiber cable whose characteristics, and in particular whose mechanical, water-proofing and fire-proofing characteristics are significantly improved compared with presently known cables.

The present invention provides a cable comprising at least one optical fiber and at least one covering layer comprising a covering material including an organic compound and an inorganic compound, the cable being characterized in that said inorganic compound has a layered structure and in that said organic compound is inserted between the layers of said inorganic compound.

At present, inorganic fillers are commonly used in one or other of the covering layers of cables, but those fillers have a particle size of micron order, they are dispersed in a polymer, and they conserve their initial size after being blended with the polymer.

In the present invention, use is made of an inorganic compound of layered structure which, after special treatment, enables an organic compound to be intercalated between its layers. The initial particle size of the inorganic compound is of micron order. When an organic compound becomes inserted between the layers, the inorganic compound exfoliates, thereby forming a composite material. After intercalation of the organic compound and exfoliation of the inorganic compound, the inorganic compound is distributed in uniform manner throughout the composite material and presents particles of a size that is of nanometer order. A significant improvement of the properties of the material is then observed, and special properties are seen to appear.

The term "essentially constituted by" is used to mean that the layer can also have smaller quantities of various additives intended in particular for facilitating the shaping thereof (plasticizers, lubricants, etc.), for slowing down aging (stabilizers, UV absorbers, flame retarders, anti-oxygen agents, anti-shock agents, etc. . . . ) or for modifying the appearance thereof (colored pigments, etc. . . . ).

The inorganic compound can be selected from a graphite and an inorganic oxide of layered structure. Graphite is selected if it is desired to obtain a conductive layer, and an inorganic oxide is selected if it is desired to obtain a layer which is electrically insulating. In the present case, it is preferable to select an oxide. Suitable inorganic oxides include metal oxides providing they present a layered structure, e.g. aluminas, titanates, or zirconias, or indeed silicates of layered structure known as phyllosilicates.

The inorganic oxide is preferably a layered structure silicate or phyllosilicate, and more preferably an aluminosilicate such as mica or a natural or artificial clay, and optionally has bridging links. The clay preferably presents a crystal structure made up of a stack of layers and possessing surface $OH^-$ ions. Suitable clays include talcs, vermiculites, kaolinites, and smectites, or any mixture of a plurality of clays. More preferably, the smectite group is selected, and in particular montmorillonite, bentonite, beidellite, nontronite, saponite, hectorite, or a mixture thereof.

In a preferred embodiment of the present invention, the selected clay is montmorillonite, also known as Fuller's earth when it contains calcium, and also known as bentonite when it contains sodium.

The organic compound intercalated between the layers of the inorganic compound is preferably a polymer, an oligomer, or a monomer that is polymerized in situ.

When the covering material of the invention is used as a protective coating on a fiber, it is preferable to use a polymer selected from polyesters, polyethers, such as polyvinyl ethers, polyurethanes, such as polyurethane acrylates, maleates, fumarates, polythiols, in particular dithiols, polyenes, copolymers or mixtures of the above-mentioned polymers such as maleate-fumarate or polythiol-polyene systems. Polymers such as epoxy resins, polyimides, polyamides, or silicones can also be treated in similar manner.

In a method of manufacturing a cable by extrusion, an extrudable polymer should be used that can be selected from polyolefins such as polyethylenes (PE) and poly-propylenes (PP), polybutyleneterephthalates (PBTP), vinyl polymers such as polyvinyl chlorides (PVC), elastomers which can optionally be halogenated, or indeed thermoplastics, silicones, copolymers thereof such as copolymers of ethylene, and mixtures of the above. Suitable ethylene copolymers include copolymers of ethylene and of vinyl acetate (EVA), copolymers of ethylene and of propylene (EPR), copolymers of ethylene and alkyl acrylate such as ethylene and ethyl acrylate (EEA) copolymer or methyl acrylate (EMA) copolymer, copolymers of ethylene and acrylic acid, terpolymers of ethylene, or the same polymers including specific functional groups (acids, epoxy, etc. . . . ).

In a method of manufacturing a cable implementing polymers of the liquid state, a polymer should be used selected from epoxy resins, polyesters, polyimides, such as polyetherimides or polyamidimides, polyamides (PA), polyurethanes, silicones, and copolymers or mixtures of the above-cited polymers.

The invention is particularly applicable to an optical fiber surrounded by at least one coating layer which is essentially constituted by the covering material. A plurality of fibers provided with such coatings can be associated with one another in order to make up a cable.

Optical fiber cables presently in use for long distance transmission are of two types. A first type has a "cellular" or free structure, i.e. it has one or more elements in the form of a tube or of a grooved rod in which the optical fibers are received. A second type of optical fiber cable has a "ribbon" structure, i.e. the optical fibers are placed parallel to one another.

A first application of the present invention relates to buried telecommunications cables. Such cables have a plurality of optical fibers. The outer sheath of the cable comprises at least one layer that is essentially constituted by the covering material of the invention.

Another application relates to underwater telecommunications cables. Such cables have a bundle of optical fibers and at least one insulating sheath surrounding the bundle and comprising at least one layer that is essentially constituted by the covering material of the invention.

The invention also provides a method of manufacturing a cable having at least one optical fiber and at least one covering layer essentially constituted by a covering material made by the following steps:

said inorganic compound is treated with an agent so as to ensure that it is compatible with said organic compound;

said treated inorganic compound is mixed with said organic compound at a temperature higher than the softening temperature or melting temperature of said organic compound; and said material is obtained, said organic compound being inserted between the layers of said inorganic compound.

The inorganic compound is treated with a wetting agent compatible with the organic compound so as to favor intercalation of the organic compound between the layers of the inorganic compound.

In an implementation of the present invention, the inorganic compound is a clay and the compatibility agent is selected from quaternary ammonium salts, polyethylene oxides, and phosphorus-containing derivatives.

Other characteristics and advantages of the present invention will appear on reading the following examples which are naturally given by way of non-limiting illustration, and from the accompanying drawing, in which.

Figure 1:
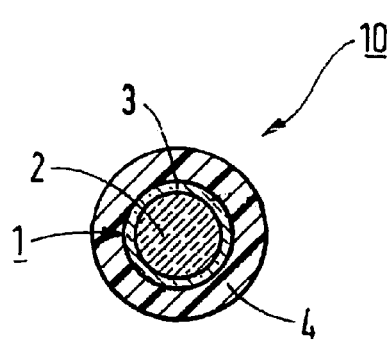
FIG. 1 is a diagrammatic section view of an optical conductor comprising an optical fiber surrounded by a protective covering.

FIG. 1 shows an optical conductor 10 comprising an optical fiber 1 constituted by an optical core 2 and surrounded by optical cladding 3. The fiber 1 is surrounded by at least one layer of a protective coating 4. The protective coating 4. is essentially constituted by the covering material of the invention.

Figure 2:
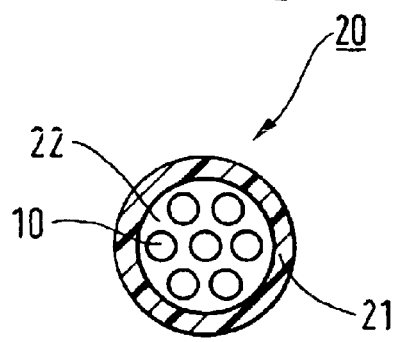
FIG. 2 is a diagrammatic section view of a bundle of optical fibers brought together in a tube.

In order to provide better mechanical strength and better protection against shock, the optical conductors 10 can be assembled together in a bundle which is placed inside a polymer tube 21, e.g. made of PP or of PBTP, as shown in FIG. 2. The conductors 10 are separated from one another by a filling compound 22 which is generally a grease.

Figure 3:
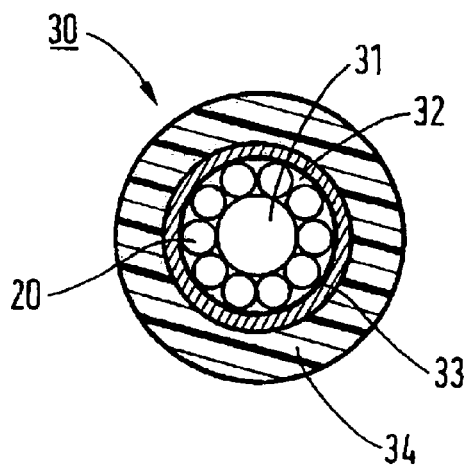
FIG. 3 is a diagrammatic section view of a land telecommunications cable.

FIG. 3 shows an optical fiber cable 30 for a land application, i.e. a cable that is designed to be buried. A plurality of tubes 20 analogous to the tube 20 shown in FIG. 2 are disposed around the periphery of a rod 31 that is often reinforced with glass fibers and that is in contact with a filling compound 32. The assembly is surrounded by metal armoring 33 covered by a sheath 34 which needs to have good mechanical properties, good fire resistance, and low permeability to water. The sheath 34 is essentially constituted by the covering material of the invention and made as described below.

10 grams (g) of bentonite are blended with 3 g of 2-oleybis-hydroxyethyl methyl ammonium chloride sold by AKZO under the name "ETHOQUAD", and the mixture is raised to 60° C. The mixture is then subjected to ultrasound for 2 minutes (min). The ammonium salt intercalates between the layers of the clay.

The treated filler is then added to the organic compound, i.e. very low density polyethylene (VLDPE) at a concentration of 5 % by weight. The mixture is then blended for 5 min at 160° C., after which it is extruded or molded around the cable.

X-ray diffraction can be used to measure variation in the distance between the layers in the inorganic compound. This distance should be found to have increased by 40% which guarantees that the polymer has been intercalated properly between the silicate layers. This type of intercalation is commonly referred to as a "nanocomposite".

The advantages provided by using the material of the present invention are summarized in the table below. In particular, there can be seen a significant improvement in withstanding fire and a decrease in the water transmission coefficient.

|  | Prior art | Invention |
| --- | --- | --- |
| Strength: |  |  |
| breaking stress | 28.5 MPa | 34 MPa |
| elongation | 570% | 604% |
| Water transmission coefficient (ASTM E 96 standard) | $43 \times 10^{-6}$ g/m$^2$/24 h | $33 \times 10^{-6}$ g/m$^2$/24 h |
| Response to fire (ASTM D 2863 standard) | the material burns and runs | the material does not run, it carbonizes |

Figure 4:
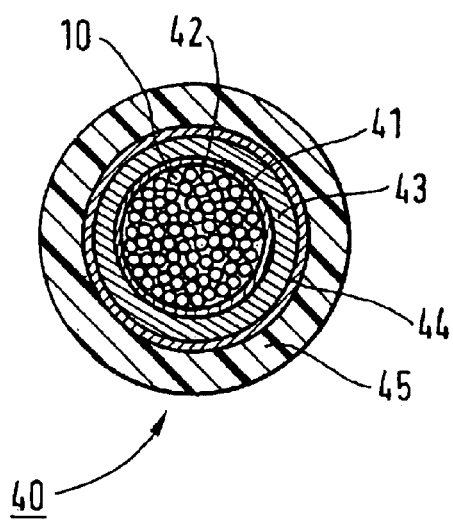
FIG. 4 is a diagrammatic section view of an underwater telecommunications cable.

For an underwater cable 40 as shown in FIG. 4, the optical conductors 10 are assembled as a bundle which is placed inside a metal tube 41. The conductors 10 are separated from one another by a filling compound 42 such as a gel. The metal tube 41 is surrounded by steel armoring 43, itself surrounded by a conducive layer 44, e.g. made of copper. The outer sheath 45 must have good mechanical properties and in particular must withstand abrasion well and must absorb very little water since it is required to isolate the underwater cable for at least 25 years. This sheath is essentially constituted by the covering material of the invention and made in the manner described above.

To make the protective coating of an optical fiber with the covering material of the invention, the procedure is similar, with the treated inorganic compound being mixed with the organic compound that is normally used for this purpose, for example a thermoplastic polymer such as a polyester or a polyurethane, or a photopolymerizable resin such as urethane, acrylate, maleate-fumarate, or polythiolpolyene resins. The material is implemented in a manner analogous to that for the materials usually used for coating fibers: the fiber is coated with the material and polymerized under UV if the polymer is photocurable. When using the material of the invention as the protective coating of an optical fiber, the water-proofing properties of the coating are significantly improved.

What is claimed is:

1. A cable comprising at least one optical fiber and at least one covering layer comprising (a) an organic compound selected from the group consisting of polymers, monomers, and oligomers and (b) a composite material, wherein:

said composite material is in the form of particles;

said particles have a size of nanometer order and include an inorganic compound;

said inorganic compound (i) is graphite or an inorganic oxide, (ii) has a layered structure, and (iii) has been treated to allow a partial amount of said organic compound to be inserted between the layers of said inorganic compound; and the partial amount of said organic compound is inserted between the layers of said inorganic compound.

2. A cable according to claim 1, in which said inorganic oxide is selected from the group consisting of a metal oxide of layered structure and a silicate of layered structure.

3. A cable according to claim 2, in which said silicate of layered structure is selected from the group consisting of mica and clay.

4. A cable according to claim 3, in which said clay is selected from the group consisting of talc, vermiculite, kaolinite, smectite, and mixtures thereof.

5. A cable according to claim 4, in which said smectite is selected from the group consisting of montmorillonite, bentonite, beidellite, nontronite, saponite, hectorite, and mixtures thereof.

6. A cable according to claim 5, in which said smectite is selected from the group consisting of montmorillonite and bentonite.

7. A cable according to claim 1, in which said organic compound is a polymer selected from the group consisting of polyesters, polyethers, polyvinyl ethers, polyurethanes, polyurethane acrylates, maleates, fumarates, polythiols, polyenes, and copolymers and mixtures thereof.

8. A cable according to claim 1, in which said organic compound is a polymer selected from the group consisting of polyolefins, polybutylene-terephtalates, vinyl polymers, elastomers, silicones, and copolymers and mixtures thereof.

9. A cable according to claim 1, in which said organic compound is a polymer selected from the group consisting of epoxy resins, polyesters, polyamides, polyimides, polyetherimides, polyamidimides, polyurethanes, silicones, and mixtures thereof.

10. A cable according to any one of claims 1, 2–6 and 7–9, comprising an optical fiber surrounded by a protective coating including at least one layer constituted essentially by said organic compound (a) and said composite material (b).

11. A cable according to any one of claims 1, 2–6 and 7–9, including a plurality of optical fibers and an outer sheath including at least one layer constituted essentially by said organic compound (a) and said composite material (b).

12. A cable according to any one of claims 1, 2–6 and 7–9, comprising a bundle of optical fibers and an insulating covering having at least one layer constituted essentially by said organic compound (a) and said composite material (b).

13. A method of manufacturing the cable according to any one of claims 1, 2–6, and 7–9, comprising:

treating said inorganic compound, which is in the form of particles having an initial size of micron order with an agent so as to ensure that said inorganic compound particles are compatible with said organic compound; and mixing said treated inorganic compound with said organic compound at a temperature higher than the softening temperature or melting temperature of said organic compound, thereby obtaining said organic compound (a) and said composite material (b), wherein said composite material (b) is in the form of said particles having a size of nanometer order and comprising said partial amount of said organic compound inserted between the layers of said inorganic compound.

14. A method according to claim 13, in which said inorganic compound is a clay and said compatibility agent is selected from the group consisting of quaternary ammonium salts, polyethylene oxides, and phosphorous-containing derivatives.

* * * * *